US012595695B2

(12) United States Patent
Lee

(10) Patent No.: US 12,595,695 B2
(45) Date of Patent: Apr. 7, 2026

(54) ADHESIVE DOOR STOPPER INSTALLATION SYSTEM

(71) Applicant: Sang Choon Lee, Daegu (KR)

(72) Inventor: Sang Choon Lee, Daegu (KR)

( * ) Notice: Subject to any disclaimer, the term of this patent is extended or adjusted under 35 U.S.C. 154(b) by 95 days.

(21) Appl. No.: 18/705,985

(22) PCT Filed: Oct. 26, 2022

(86) PCT No.: PCT/KR2022/016419
§ 371 (c)(1),
(2) Date: Apr. 29, 2024

(87) PCT Pub. No.: WO2023/238994
PCT Pub. Date: Dec. 14, 2023

(65) Prior Publication Data

US 2025/0314108 A1 Oct. 9, 2025

(30) Foreign Application Priority Data

Jun. 8, 2022 (KR) ........................ 10-2022-0069454

(51) Int. Cl.
*E05C 17/44* (2006.01)

(52) U.S. Cl.
CPC ......... *E05C 17/44* (2013.01); *E05Y 2201/224* (2013.01); *E05Y 2900/132* (2013.01)

(58) Field of Classification Search
CPC ............... E05C 17/44; E05Y 2201/224; E05Y 2900/1323
See application file for complete search history.

(56) References Cited

U.S. PATENT DOCUMENTS 3,731,341 A * 5/1973 Woodruff .............. E05C 19/004 292/297
3,809,419 A * 5/1974 Chezem ................ E05C 17/443 292/210
3,831,989 A * 8/1974 Gurzenda ............ E05C 17/443 16/86 A (Continued)

FOREIGN PATENT DOCUMENTS

JP 2000160909 A 6/2000
KR 20110075590 A 7/2011

(Continued)

*Primary Examiner* — Mark A Williams
(74) *Attorney, Agent, or Firm* — NKL Law; Jae Youn Kim

(57) ABSTRACT

Provided is an adhesive door stopper installation system for the boltless installation of a door stopper, which supports a door open state by means of a support bar that is hinge-coupled to a fixing bracket and pivots, on a door. The adhesive door stopper installation system includes, as main components, an adhesive plate, a gap-maintaining piece, an inner compartment, a fastening pipe, a temporary assembly module, and a buffer pad, wherein an elastic piece and a quadrangular hole are fitted to improve the structure of the fixing bracket so that the gap-maintaining piece can be temporarily assembled, thus making it possible for anyone to easily install the door stopper at the correct position, and the buffer pad can come into local contact with the edge of the fixing bracket via the gap-maintaining piece to flexibly absorb the repetitive impact load generated during the folding operation of the door stopper.

5 Claims, 6 Drawing Sheets

(56) References Cited

U.S. PATENT DOCUMENTS

| | | | | | |
|---|---|---|---|---|---|
| 5,282,658 | A * | 2/1994 | Reeves, Jr. | E05C 17/443 | 292/338 |
| 5,575,514 | A * | 11/1996 | Troy | E05C 19/066 | 292/DIG. 19 |
| 5,590,928 | A * | 1/1997 | Voiculescu | E05C 17/446 | 292/338 |
| 5,652,998 | A * | 8/1997 | McKenzie | E05F 5/04 | 16/83 |
| 5,771,533 | A | 6/1998 | Kuang-Pin | | |
| 2008/0127457 | A1* | 6/2008 | Deng | E05C 17/443 | 16/402 |
| 2012/0080891 | A1* | 4/2012 | Bravo | E05C 17/443 | 292/251.5 |
| 2012/0235428 | A1* | 9/2012 | Blacklaws | E05C 19/004 | 292/338 |
| 2020/0318404 | A1* | 10/2020 | Rashed | E05C 17/44 | |

FOREIGN PATENT DOCUMENTS

| | | | | |
|---|---|---|---|---|
| KR | 101641584 | B1 | 7/2016 | |
| KR | 102128605 | B1 * | 7/2020 | E05C 17/443 |

* cited by examiner

ADHESIVE DOOR STOPPER INSTALLATION SYSTEM

TECHNICAL FIELD

The present disclosure relates to an adhesive door stopper installation system, and more specifically, to an adhesive door stopper installation system having an improved structure of a fixing bracket where a gap-maintaining piece is temporarily assembled by fit-coupling between an elastic piece and a quadrangular hole, thereby allowing anyone to easily install a door stopper in the correct position, and flexibly absorbing repetitive impact loads generated during the folding operation of the door stopper when a buffer pad gets in local contact with the edge of the fixing bracket by the gap-maintaining piece.

BACKGROUND ART

In general, a door stopper is installed at the bottom of the inner side of an entrance door and supports the door in an open state to prevent the door from closing. The door stopper includes: a base fixed at the bottom of the door by a screw; a support bar hinge-coupled to a bracket integrally formed on the base to rotate; and a rubber pad installed at the end of the support bar to contact and support the floor.

However, when the door is kept open, the load in the door closing direction transmitted through the support bar is concentrated on the screw fixing the base and the door, so the screw comes loose or a gap is formed in the base, resulting in the loss of door stopper function.

Accordingly, as a conventional technology, Korean patent No. 10-1641584 discloses door support device comprises: a coupling means comprising a coupling plate having a coupling surface to come in contact with a door, a pair of dented parts formed on a left and a right side of an inner surface of the coupling surface formed on the coupling plate, and a first and a second position adjustment groove formed on the inside of the dented parts and formed in a long hole shape extended in a vertical direction to couple a bolt, wherein any one position among an upward position and a downward position is formed in a size equal to the diameter of the bolt, and the size thereof becomes larger than the diameter of the bolt when extended towards the other position; and a door stopper comprising a coupling bracket coupled to the coupling means by the bolt, a support part rotatably coupled to the coupling bracket, and a pad support part formed on a lower side of the support part.

However, the conventional technology aimed to improve contact force between the lower surface of the pad support part and the floor surface when elastic force is applied to the pad support part during the use of the door stopper, and to prevent noise reduction and damage when collision occurs between the coupling bracket and the pedal during the operation of the door stopper. However, the conventional technology is complex in structure, has no price competitiveness because of high manufacturing costs due to component diversification, and may cause a damage of the door since the coupling plate has to be coupled to the door by a screw nail. In addition, in households which have no dedicated tools including a dill, it is difficult for anyone to easily install the door stopper.

DISCLOSURE

Technical Problem

Accordingly, the present invention has been made in view of the above-mentioned problems occurring in the related art, and it is an object of the present invention to provide an adhesive door stopper installation system having an improved structure of a fixing bracket where a gap-maintaining piece is temporarily assembled by fit-coupling between an elastic piece and a quadrangular hole, thereby allowing anyone to easily install a door stopper in the correct position, and flexibly absorbing repetitive impact loads generated during the folding operation of the door stopper when a buffer pad gets in local contact with the edge of the fixing bracket by the gap-maintaining piece.

Technical Solution

To accomplish the above-mentioned objects, according to the present invention, there is provided an adhesive door stopper installation system for installing a door stopper 1, which supports a door in an open state by a support bar 1*b* hinge-coupled to a fixing bracket 1*a* to move pivotally, without bolting.

The adhesive door stopper installation system includes: an adhesive plate 10 having an adhesive surface 12 formed on one side to be adhered to the door; a gap-maintaining piece 20 protruding on the other side of the adhesive plate 10 to locally support an edge area of the fixing bracket 1*a* and to support a gap between the adhesive plate 10 and the fixing bracket 1*a*; an inner compartment 30 forming an isolation section between the adhesive plate 10 and the fixing bracket 1*a* by the gap-maintaining piece 20; a fastening pipe 40 protruding on the adhesive plate 10 corresponding to the inner compartment 30 and screw-coupled with a bolt 42 inserted through a mounting hole H of the fixing bracket 1*a*; a temporary assembly module 50 provided to couple the adhesive plate 10 and the fixing bracket 1*a* by fit-coupling; and a buffer pad 60 installed on one side of the fixing bracket 1*a* and provided to be grounded to the gap-maintaining piece 20 and the fastening pipe 40.

In this instance, the inside of the inner compartment 30 is divided into a plurality of spaces by partition plates 32, which are provided to connect the gap-maintaining piece 20 and the fastening pipe 40.

Moreover, the temporary assembly module 50 includes: a quadrangular hole 52 formed in the fixing bracket 1*a*; and a pair of elastic pieces 54 protruding on the adhesive plate 10 corresponding to the quadrangular hole 52 to be fit-coupled to both sides of the quadrangular hole 52.

Furthermore, the elastic pieces 54 are arranged vertically, and each has a side with width smaller than the vertical width of the quadrangular hole 52 and has a retaining portion 56 protruding on the top thereof in the vertical direction. When the fixing bracket 1*a* is moved downward in the state in which the elastic pieces 54 are inserted into the quadrangular hole 52, the retaining portion 56 is engaged with the rear side of the fixing bracket 1*a*.

Additionally, the elastic pieces 54 are arranged vertically, and the retaining portion 57 is provided between the elastic pieces 54 in the horizontal direction, and is inserted into the quadrangular hole 52 to be engaged with the rear side of the fixing bracket 1*a*.

Moreover, the adhesive plate 10 is made of polycarbonate material, and positioning grooves 14 are formed on the adhesive plate 10 corresponding to the inner compartment 30. The positioning grooves 14 are formed to a depth of 80 to 95% of the thickness of the adhesive plate 10 to guide a screw coupling position.

Additionally, the position of the adhesive plate 10 adhered to the door is determined by a setting member 70, wherein the setting member 70 includes: a support portion 71, of which one end is connected to the adhesive plate 10 and the other end is grounded to the floor surface G corresponding to the door opening and closing radius; and a cutting line 72 formed as a notch at a boundary portion between the adhesive plate 10 and the support portion 71. After the adhesive surface 12 is adhered to the door in the state in which the height of with the adhesive plate 10 is adjusted so that the support portion 71 is grounded to the floor surface G, the support portion 71 is bent and removed along the cutting line 72.

In addition, the position of the adhesive plate 10 adhered to the door is determined by a setting member 70, wherein the setting member 70 includes: a release sheet 75 attached to protect the adhesive surface 12; and a tear line 76 formed horizontally at a position 3 to 10 mm above the bottom of the release sheet 75 in the upward direction. The release sheet 75 is divided into an upper sheet 75*a* and a lower sheet 75*b* bounded by the tear line 76. After the upper sheet 75*a* of the release sheet 75 is separated from the adhesive surface 12 and folded downward at 180° along the tear line 76, the height of the adhesive plate 10 is adjusted so that the bottom of the upper sheet 75*a* is grounded to the floor surface G corresponding to the opening and closing radius of the door, the adhesive surface 12 is adhered to the door, and then, when the user pulls the upper area of the release sheet downwards, the lower area of the release sheet is separated from the adhesive surface.

Advantageous Effect

According to an embodiment of the present invention, the adhesive door stopper installation system has the improved structure of the fixing bracket where the gap-maintaining piece is temporarily assembled by fit-coupling between the elastic piece and the quadrangular hole, thereby allowing anyone to easily install the door stopper in the correct position, and flexibly absorbing repetitive impact loads generated during the folding operation of the door stopper when the buffer pad gets in local contact with the edge of the fixing bracket by the gap-maintaining piece.

MODE FOR INVENTION

Hereinafter, a preferred embodiment of the present invention will be described in detail with reference to the accompanying drawings.

Figure 1:
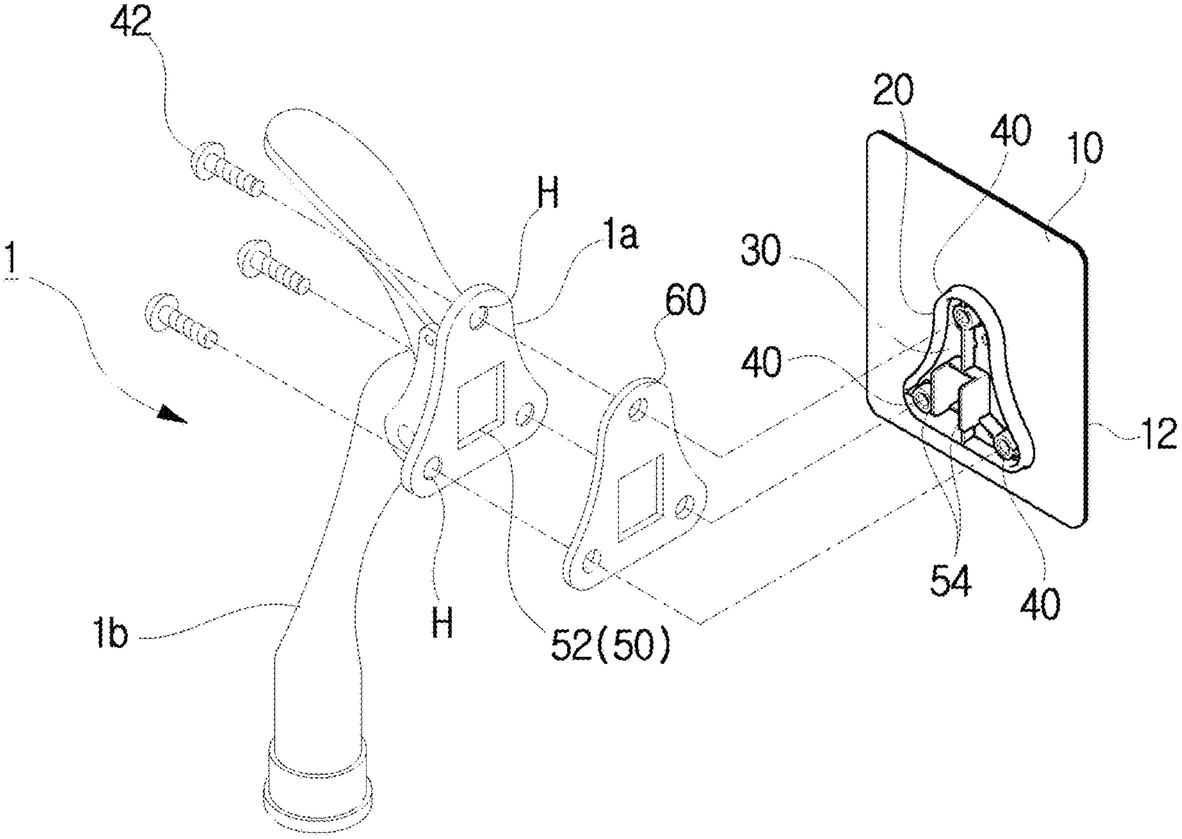
FIG. 1 is a perspective view illustrating an adhesive door stopper installation system according to an embodiment of the present invention.
Figure 2:
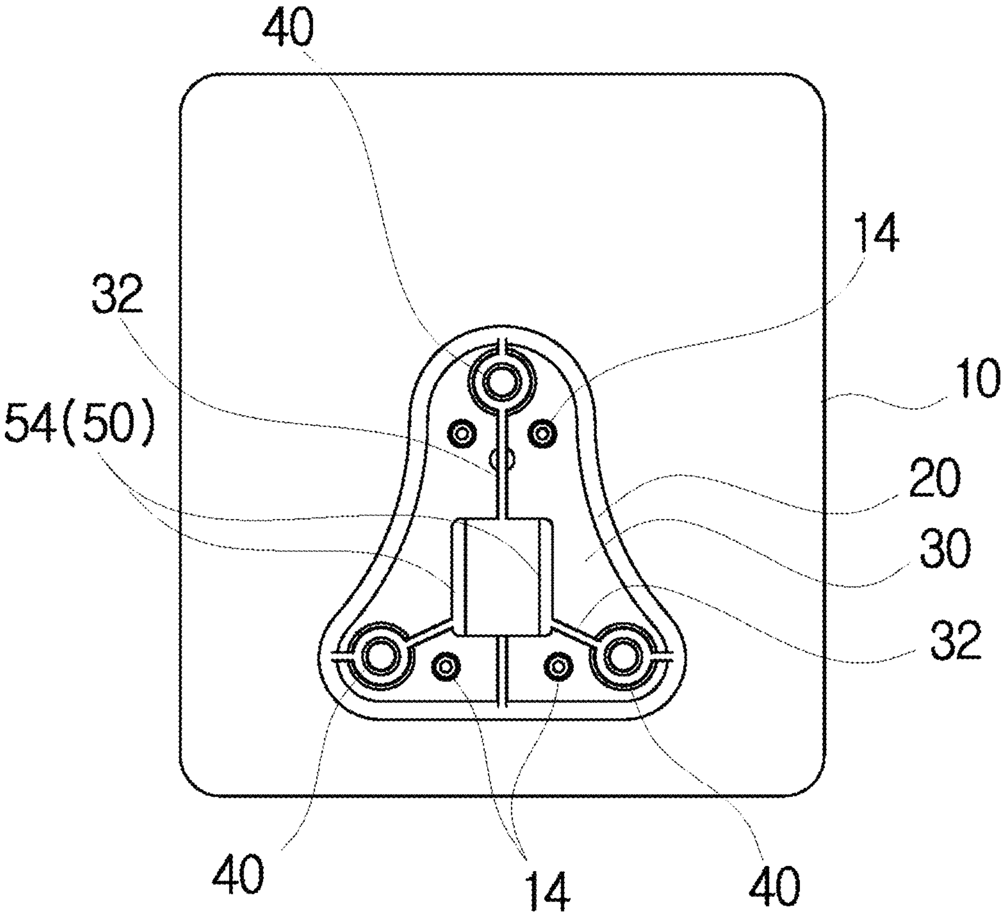
FIG. 2 is a diagram illustrating an adhesive plate of the adhesive door stopper installation system according to an embodiment of the present invention.
Figure 3A:
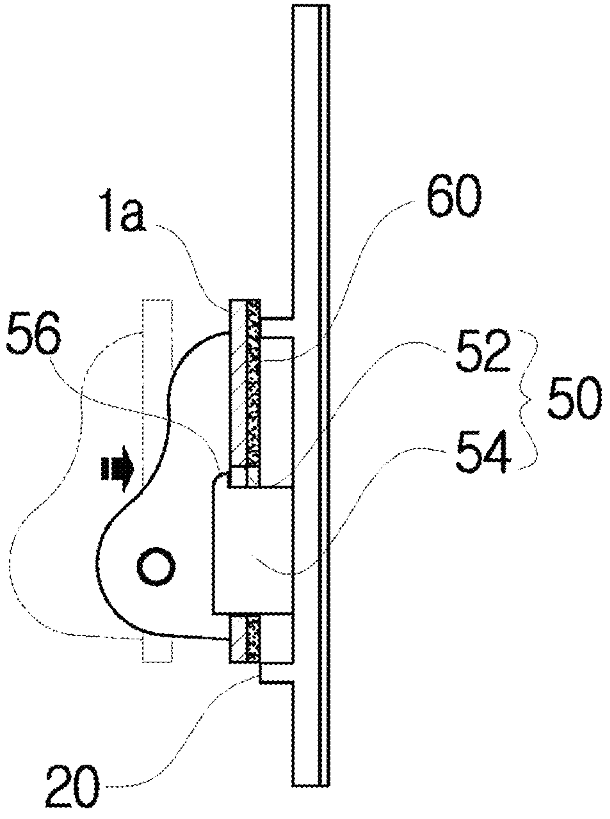
FIGS. 3(*a*)-3(*b*) and 4 are configuration diagrams illustrating a temporary assembly module of the adhesive door stopper installation system according to an embodiment of the present invention.
Figure 3B:
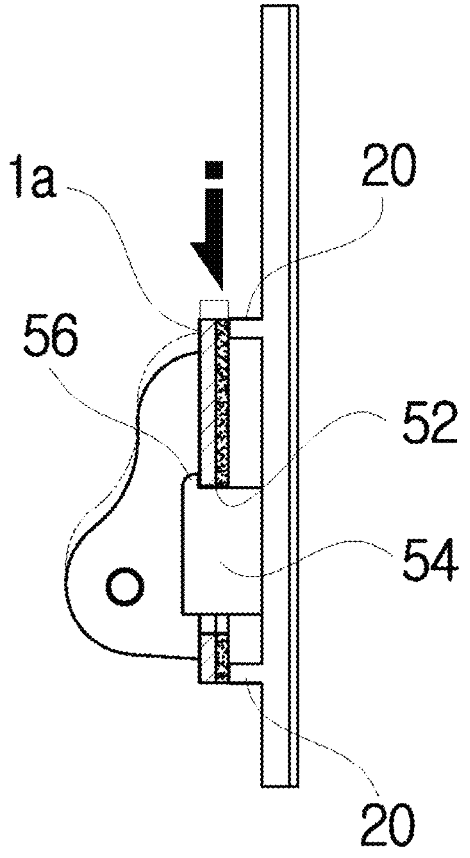
Figure 5A:
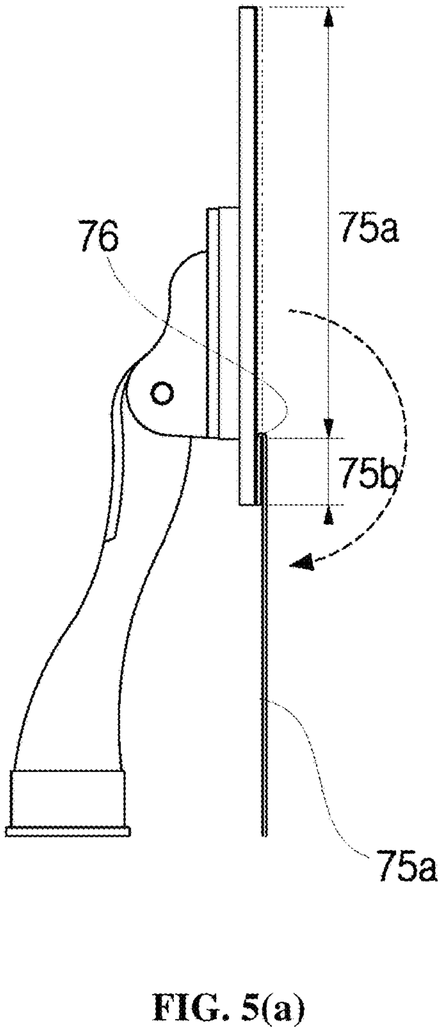
FIGS. 5(*a*)-5(*b*) and 6 are configuration diagrams illustrating a setting member of the adhesive door stopper installation system according to an embodiment of the present invention.
Figure 5B:
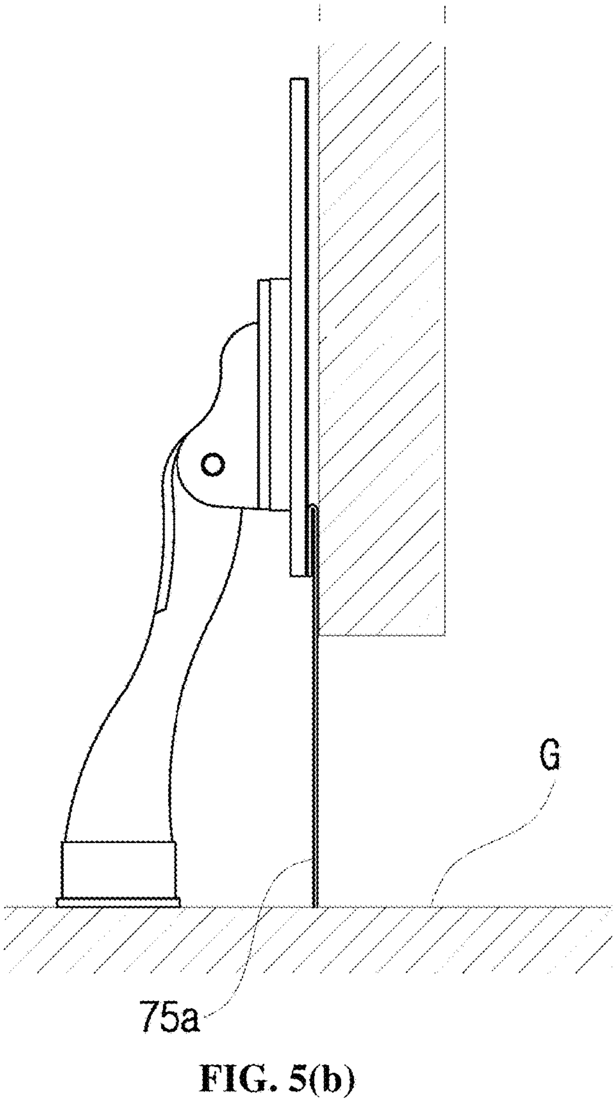

FIG. 1 is a perspective view illustrating an adhesive door stopper installation system according to an embodiment of the present invention, FIG. 2 is a diagram illustrating an adhesive plate of the adhesive door stopper installation system according to an embodiment of the present invention, FIGS. 3(*a*)-3(*b*) and 4 are configuration diagrams illustrating a temporary assembly module of the adhesive door stopper installation system according to an embodiment of the present invention, FIGS. 5(*a*)-5(*b*) and 6 are configuration diagrams illustrating a setting member of the adhesive door stopper installation system according to an embodiment of the present invention.

The present invention relates to an adhesive door stopper installation system for installing a door stopper 1, which supports a door in an open state by a support bar 1*b* hinge-coupled to a fixing bracket 1*a* to move pivotally, without bolting. In this instance, the adhesive door stopper installation system is improved in structure such that a fixing bracket and a gap-maintaining piece are temporarily assembled by fit-coupling between an elastic piece and a quadrangular hole, thereby allowing anyone to easily install a door stopper in the correct position, and flexibly absorbing repetitive impact loads generated during the folding operation of the door stopper when a buffer pad gets in local contact with the edge of the fixing bracket by the gap-maintaining piece. For this purpose, the adhesive door stopper installation system includes an adhesive plate 10, a gap-maintaining piece 20, an inner compartment 30, a fastening pipe 40, a temporary assembly module 50, and a buffer pad 60.

The adhesive plate 10 according to the present invention has an adhesive surface 12 formed on one side to be adhered to the door.

The adhesive plate 10 is formed of synthetic resin material, and is provided for mass production by injection molding.

Furthermore, adhesive tape is attached to one side of the adhesive plate 10, and is covered with a release sheet, such that upon on-site installation, when a user removes the release sheet, the adhesive surface 12 is exposed.

Moreover, the gap-maintaining piece 20 according to the present invention protrudes on the other side of the adhesive plate 10 to locally support an edge area of the fixing bracket 1*a* and to support a gap between the adhesive plate 10 and the fixing bracket 1*a*.

The gap-maintaining piece 20 is formed to have the same shape as the outer appearance of the fixing bracket 1*a* of the door stopper 1, as illustrated in FIG. 1.

Additionally, the gap-maintaining piece 20 creates a gap between the adhesive plate 10 and the fixing bracket 1*a*, and a fastening pipe 40, which will be described later, protrudes by the distance of the gap to ensure a space for fastening a bolt 42.

Furthermore, the inner compartment 30 according to the present invention forms an isolation section between the adhesive plate 10 and the fixing bracket 1*a* by the gap-maintaining piece 20.

The inner compartment 30 serves as a space where the adhesive plate 10 and the fixing bracket 1*a* are spaced apart from each other without contact, and forms an isolated section along with the gap-maintaining piece 20, to provide a space capable of buffering the impact applied from the door stopper 1, together with the buffer pad 60.

That is, by the inner compartment 30, the edge area of the fixing bracket 1*a* is in local contact with the gap-maintaining piece 20 to locally compress the buffer pad 60, thereby improving buffering efficiency.

Additionally, the fastening pipe 40 according to the present invention protrudes on the adhesive plate 10 corresponding to the inner compartment 30, and is screw-coupled with a bolt 42 inserted through a mounting hole H of the fixing bracket 1*a*.

The fastening pipe 40 is located at a position corresponding to the mounting hole H of the fixing bracket 1*a*, and is internally hollow to form a female thread while the bolt 42 enters, thereby being coupled.

Furthermore, the temporary assembly module 50 according to the present invention is provided to couple the adhesive plate 10 and the fixing bracket 1*a* by fit-coupling.

The temporary assembly module 50 includes: a quadrangular hole 52 formed in the fixing bracket 1*a*; and a pair of elastic pieces 54 protruding on the adhesive plate 10 corresponding to the quadrangular hole 52 to be fit-coupled to both sides of the quadrangular hole 52.

In this instance, since the width of the pair of elastic pieces 54 is larger than the width of the quadrangular hole 52, when the elastic pieces are fit-coupled, the elastic pieces 54 are deformed elastically and is forcedly fit to the quadrangular hole 52.

As described above, the fixing bracket 1*a* is temporarily assembled to match the gap-maintaining piece 20 by the fit-coupling of the elastic pieces 54 and the quadrangular hole 52.

In this instance, the elastic pieces 54 are arranged vertically, and each has a side with width smaller than the vertical width of the quadrangular hole 52 and has a retaining portion 56 protruding on the top thereof in the vertical direction.

As illustrated in FIGS. 3(*a*)-3(*b*), when the fixing bracket 1*a* is moved downward in the state in which the elastic pieces 54 are inserted into the quadrangular hole 52, the retaining portion 56 is engaged with the rear side of the fixing bracket 1*a* to enhance the fastening force between the fixing bracket 1*a* and the adhesive plate 10, thereby preventing movement and separation of the fixing bracket 1*a* even when a high load is applied to the door stopper 1.

Figure 4:
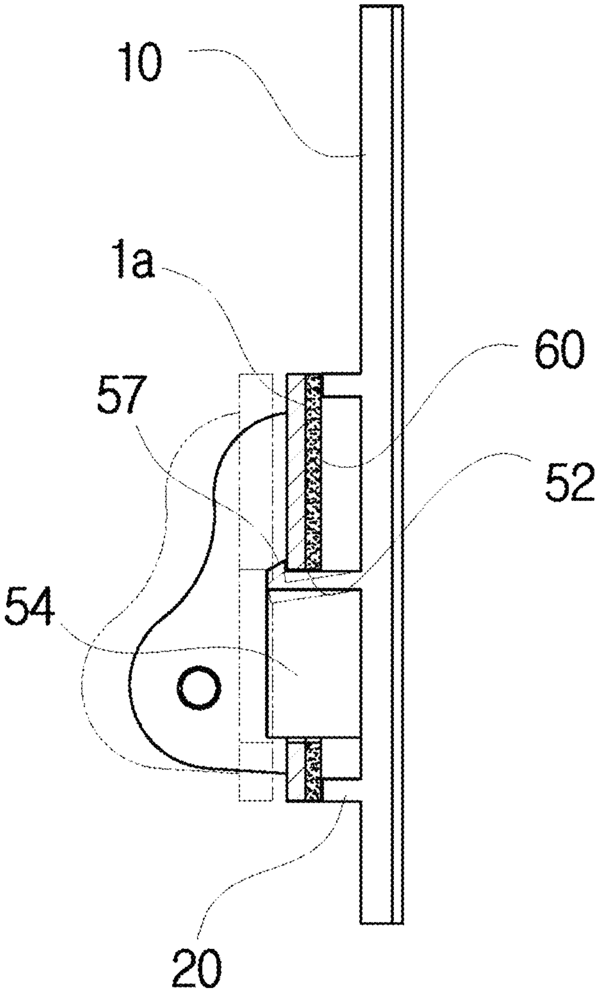

In FIG. 4, the elastic pieces 54 are arranged vertically, and the retaining portion 57 is provided between the elastic pieces 54 in the horizontal direction.

The retaining portion 57 is inserted into the quadrangular hole 52 and engaged with the rear side of the fixing bracket 1*a*, such that the fixing bracket 1*a* and the adhesive plate 10 are temporarily assembled by the temporary assembly module 50, and then, are fastened by the retaining portion 57 to be fixed in position.

Accordingly, during the installation of the door stopper 1 on the door, since the movement of the fixing bracket 1*a* is prevented, anyone can easily construct the door stopper in correct position.

In addition, the buffer pad 60 according to the present invention is installed on one side of the fixing bracket 1*a* to be grounded to the gap-maintaining piece 20 and the fastening pipe 40.

The buffer pad 60 is formed of rubber material, and has the same shape as the fixing bracket 1*a*.

Furthermore, the buffer pad 60 is positioned between the fixing bracket 1*a* and the gap-maintaining piece 20 to flexibly absorb repetitive impact loads generated during the folding operation of the door stopper 1, thereby effectively preventing loosening of the bolt 42.

In FIG. 2, the inside of the inner compartment 30 is divided into a plurality of spaces by partition plates 32, which are provided to connect the gap-maintaining piece 20 and the fastening pipe 40.

The gap-maintaining piece 20 and the fastening pipe 40 are interdependently reinforced by the partition plates 32, thereby enhancing durability. The buffer pad 60 expands the support area by the partition plates 32, thereby improving the impact absorption efficiency during the folding operation of the door stopper 1.

Additionally, the adhesive plate 10 is made of polycarbonate material, and positioning grooves 14 are formed on the adhesive plate 10 corresponding to the inner compartment 30.

The positioning grooves 14 are formed to a depth of 80 to 95% of the thickness of the adhesive plate 10 to guide a screw coupling position.

That is, if the adhesive force is not strong enough due to the adhesive surface 12 of the adhesive plate 10, an additional screw nail can be coupled through the positioning grooves 14 to reinforce the fastening force.

Figure 6:
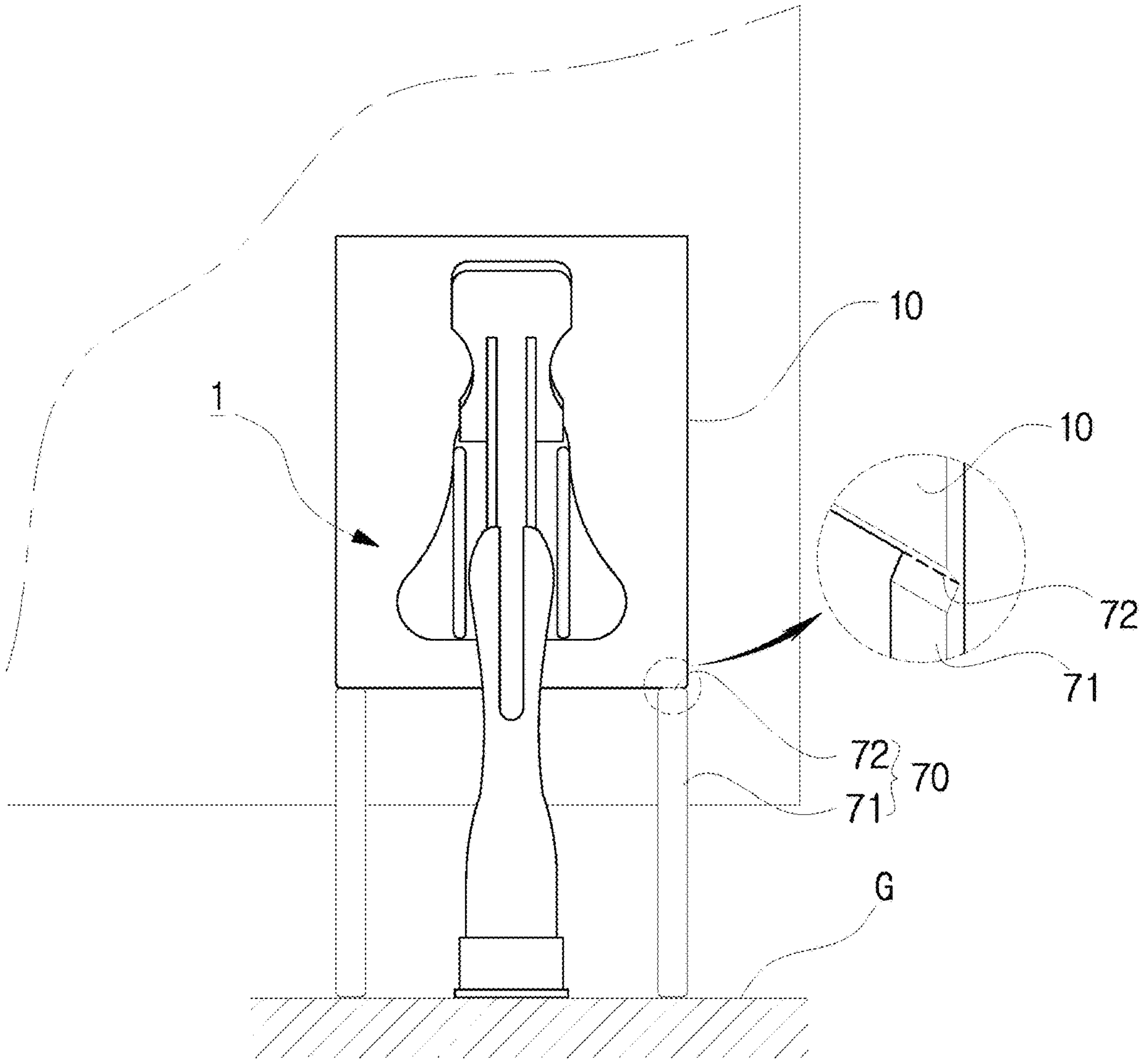

In FIG. 6, the position of the adhesive plate 10 adhered to the door is determined by a setting member 70.

The setting member 70 includes: a support portion 71, of which one end is connected to the adhesive plate 10 and the other end is grounded to the floor surface G corresponding to the door opening and closing radius; and a cutting line 72 formed as a notch at a boundary portion between the adhesive plate 10 and the support portion 71.

In this case, it is desirable for the support portion 71 to be integrally molded with the adhesive plate 10 by injection molding.

In use, after the adhesive surface 12 is adhered to the door in the state in which the height of with the adhesive plate 10 is adjusted so that the support portion 71 is grounded to the floor surface G, the support portion 71 is bent and removed along the cutting line 72.

As described above, the installation height and horizontality of the adhesive plate 10 can be accurately maintained by the support portion 71, thereby providing convenience for self-installation by anyone at home.

In FIGS. 5(*a*)-5(*b*), the position of the adhesive plate 10 adhered to the door is determined by a setting member 70.

The setting member 70 includes: a release sheet 75 attached to protect the adhesive surface 12; and a tear line 76 formed horizontally at a position 3 to 10 mm above the bottom of the release sheet 75 in the upward direction.

The release sheet 75 is divided into an upper sheet 75*a* and a lower sheet 75*b* bounded by the tear line 76, and the upper sheet 75*a* is locally separated from the adhesive surface 12 to be folded downward along the tear line 76.

Here, the tear line 76 is configured by repetitively arranging cutting parts and connecting parts at regular intervals so that the user can accurately fold the upper sheet 75*a* of the release sheet 75.

The usage state will be described. As illustrated in FIG. 5(*a*), the upper sheet 75*a* of the release sheet 75 is separated from the adhesive surface 12, then folded downward at 180° along the tear line 76. Thereafter, as illustrated in FIG. 5(*b*), after the height of the adhesive plate 10 is adjusted so that the bottom of the upper sheet 75*a* is grounded to the floor surface G corresponding to the opening and closing radius of the door, the adhesive surface 12 is adhered to the door, and then, when the user pulls the upper area of the release sheet downwards, the lower area of the release sheet is separated from the adhesive surface.

As described above, the adhesive door stopper installation system according to the present invention can accurately maintain the installation height and horizontality of the adhesive plate 10 by using the release sheet 75, thereby providing convenience for anyone to easily self-install in a household.

The invention claimed is:

1. An adhesive door stopper installation system for installing a door stopper, which supports a door in an open state by a support bar hinge-coupled to a fixing bracket to move pivotally, the adhesive door stopper installation system comprising:

an adhesive plate having an adhesive surface disposed on one side thereof to be adhered to the door;

a gap-maintaining piece protruding on another side of the adhesive plate to locally support an edge area of the fixing bracket and defining a gap between the adhesive plate and the fixing bracket;

an inner compartment forming an isolation section between the adhesive plate and the fixing bracket by the gap-maintaining piece;

a fastening pipe protruding on the adhesive plate, disposed inside the inner compartment and screw-coupled with a bolt inserted through a mounting hole of the fixing bracket;

a temporary assembly module configured to couple the adhesive plate and the fixing bracket by fit-coupling; and a buffer pad installed on one side of the fixing bracket and configured to be grounded to the gap-maintaining piece and the fastening pipe, wherein the temporary assembly module comprises:

a quadrangular hole disposed in the fixing bracket; and a pair of elastic pieces protruding on the adhesive plate and configured to be fit-coupled to both sides of the quadrangular hole, wherein the pair of elastic pieces are arranged vertically, each of the elastic pieces having a side with a width smaller than the vertical width of the quadrangular hole and a retaining portion protruding from a top thereof in the vertical direction, and wherein, when the fixing bracket is moved downward in the state in which the pair of elastic pieces are inserted into the quadrangular hole, each retaining portion is engaged with a rear side of the fixing bracket.

2. The adhesive door stopper installation system according to claim 1, wherein the inside of the inner compartment is divided into a plurality of spaces by partition plates connected to one or more of the gap-maintaining piece and the fastening pipe.

3. The adhesive door stopper installation system according to claim 1, wherein the adhesive plate is made of polycarbonate material, and positioning grooves are disposed on the adhesive plate and disposed inside the inner compartment, wherein each of the positioning grooves has a depth of 80 to 95% of the thickness of the adhesive plate to guide a screw coupling position.

4. The adhesive door stopper installation system according to claim 1, wherein a position of the adhesive plate adhered to the door is determined by a setting member, wherein the setting member includes:

a support portion, of which one end is connected to the adhesive plate and another end is grounded to a floor surface; and a cutting line disposed at a boundary portion between the adhesive plate and the support portion, and wherein, after the adhesive surface is adhered to the door in the state in which the height of the adhesive plate is adjusted so that the support portion is grounded to the floor surface, and the support portion is bent and removed along the cutting line.

5. The adhesive door stopper installation system according to claim 1, wherein the position of the adhesive plate adhered to the door is determined by a setting member, wherein the setting member includes:

a release sheet attached to the adhesive surface; and a tear line disposed horizontally at a position 3 to 10 mm above a bottom of the release sheet in an upward direction, wherein the release sheet is divided into an upper sheet and a lower sheet bounded by the tear line, and wherein, after the upper sheet of the release sheet is separated from the adhesive surface and folded downward at 180° along the tear line, the height of the adhesive plate is adjusted so that a bottom of the upper sheet is grounded to a floor surface, the adhesive surface is adhered to the door, and then, when the upper area of the release sheet is pulled downwards, the lower area of the release sheet is separated from the adhesive surface.

* * * * *